United States Patent
Ziegler et al.

(10) Patent No.: US 7,561,144 B2
(45) Date of Patent: Jul. 14, 2009

(54) TOUCH-SENSITIVE INPUT DEVICE AND FAULT DETECTION DEVICE FOR A TOUCH-SENSITIVE INPUT DEVICE, IN PARTICULAR FOR MEDICO-TECHNICAL DEVICES

(75) Inventors: Thomas Ziegler, München (DE); Thomas Kobler, München (DE)

(73) Assignee: Sorin Group Deutschland GmbH, München (DE)

( * ) Notice: Subject to any disclaimer, the term of this patent is extended or adjusted under 35 U.S.C. 154(b) by 600 days.

(21) Appl. No.: 10/580,587

(22) PCT Filed: Nov. 22, 2004

(86) PCT No.: PCT/EP2004/013238

§ 371 (c)(1),
(2), (4) Date: May 25, 2006

(87) PCT Pub. No.: WO2005/051192

PCT Pub. Date: Jun. 9, 2005

(65) Prior Publication Data

US 2007/0126706 A1 Jun. 7, 2007

(30) Foreign Application Priority Data

Nov. 25, 2003 (DE) .............................. 103 54 966

(51) Int. Cl.
G06F 3/041 (2006.01)
G06K 11/06 (2006.01)
(52) U.S. Cl. .................................. 345/173; 178/18.02
(58) Field of Classification Search ......... 345/173–178; 178/18.01–18.11
See application file for complete search history.

(56) References Cited

U.S. PATENT DOCUMENTS

| 3,777,222 A | 12/1973 | Harris |
| 5,335,230 A | 8/1994 | Crooks et al. |
| 5,940,065 A * | 8/1999 | Babb et al. .................. 345/178 |
| 6,005,200 A | 12/1999 | Stanchak et al. |
| 6,016,140 A | 1/2000 | Blouin et al. |
| 7,372,510 B2 * | 5/2008 | Abileah ...................... 345/173 |
| 2002/0097228 A1 | 7/2002 | Park et al. |
| 2003/0080716 A1 | 5/2003 | Kao |
| 2003/0222857 A1* | 12/2003 | Abileah ...................... 345/173 |

FOREIGN PATENT DOCUMENTS

| DE | 39 14 645 A1 | 11/1989 |
| DE | 197 35 106 A1 | 2/1999 |
| DE | 197 53 742 A1 | 6/1999 |

(Continued)

OTHER PUBLICATIONS

IBM Corp., "Automatic Zeroing of Force-Sensitive Touch Screen" (XP 000097690), IBM Technical Disclosure Bulletin, vol. 32, No. 11; Apr. 1990, pp. 244-245.

*Primary Examiner*—David L Lewis
(74) *Attorney, Agent, or Firm*—Scully, Scott, Murphy & Presser, P.C.

(57) ABSTRACT

The invention relates to a resistive touch-sensitive device for detecting a short-term or long-term dysfunction by means of measuring devices (32,33), a monitoring device (34) and a memory (35) in such a way that a timely signaling is carried out.

24 Claims, 2 Drawing Sheets

FOREIGN PATENT DOCUMENTS

| | | |
|---|---|---|
| EP | 0 528 598 A2 | 2/1993 |
| EP | 0 333 136 B1 | 8/1994 |
| EP | 0 982 677 A2 | 3/2000 |
| WO | WO 95/12843 | 5/1995 |
| WO | WO 03/049002 A2 | 6/2003 |

\* cited by examiner

TOUCH-SENSITIVE INPUT DEVICE AND FAULT DETECTION DEVICE FOR A TOUCH-SENSITIVE INPUT DEVICE, IN PARTICULAR FOR MEDICO-TECHNICAL DEVICES

FIELD OF THE INVENTION

The present invention relates to a touch-sensitive input device and a fault detection device for a touch-sensitive input device, in particular for medico-technical devices, preferably life-support systems such as heart-lung machines or artificial respiration devices.

In order to be able to operate and monitor medico-technical devices reliably, these devices must be provided with display and control devices which allow the user to determine the operating state of the device in a clear manner and to intervene in the operation of the device using control elements. Thus, for example, heart-lung machines are provided with display and control elements for the different units, for example the blood pumps or the oxygenator, via which the user is able to monitor and influence the operation of the HLM units. In addition, display and control elements are provided for various sensors, for example fill level sensors, temperature sensors or air bubble detectors, on which the user can read a sensor measured value and set limiting values that trigger an alarm or another reaction when they are exceeded or undershot. In HLMs, these display and control elements have recently often been combined in the form of a display and control panel, so that the user can clearly monitor and control the operation of the entire heart-lung machine from one position.

Display and control panels of the type discussed here are increasingly being implemented using program-controlled screens and keyboard units. Recently, these user interfaces (GUI =graphical user interface) have been used in the form of LCD displays in combination with a touch-sensitive input interface on the LCD display interface (touch screen). This means that the user is not only able to read values on the display, but can also operate buttons, switches and regulators depicted on the display by touching the display interface in the area where a button, switch or regulator is depicted.

The use of touch-screen GUI units of this kind permits the simple operation of even complex systems, in particular by reducing the number of control elements and thereby increasing clarity by means of a context-dependent design of the control options and by means of situation-dependent support by the system. GUI units of this type also offer advantages with regard to production, in particular in the case of high quantities. However, it has the drawback that when using a GUI unit, a display defect can lead to a complete loss of system control. Interaction with the user via the GUI unit is no longer possible in the case of a total failure. Even partial failures can lead to an unacceptable impairment of the operability of the medico-technical device. It must be noted in this regard that touch-sensitive input devices are by nature susceptible to mechanical defects.

This is particularly applicable to the frequently-used resistive touch-sensitive input device using so-called 4-wire technology. Due to their simple design and low costs, resistive touch-sensitive input devices in 4-wire technology are also of interest as components for medico-technical devices and especially as the attainable solution is completely adequate in the majority of cases. However, in the case of medico-technical devices, in particular in the field of life-support systems, very high requirements are placed on reliability and dependability. Generally, resistive touch-sensitive input devices are not able to meet these requirements.

In the case of resistive touch-sensitive input devices, a differentiation is made between two groups of faults. On the one hand, the touch-sensitive input device can fail completely. The possible causes are: line interruption of at least one line, short circuit between two lines, failure of the evaluation circuit or voltage failure. A malfunction is usually only noticed when the touch-sensitive input interface is touched, that is when an entry is to be made. On the other hand, functional changes can occur with resistive touch-sensitive input devices. The possible causes are: resistance changes in the resistive layer, changes to a connection/port. The changes cause the point of contact to be determined incorrectly during the entry; in the worst cases, a different operation than that intended takes place. In this case, once again, the fault is only noticed when the touch-sensitive input interface is touched, that is when the entry is made.

In view of the above, it is the object of the invention to demonstrate how malfunctions of the type specified above can be determined in advance in order to enable a reference to be made to a malfunction and preferably also a correction to be made.

The object is achieved by means of a touch-sensitive input device with the features of claim 1 and a fault detection device for a touch-sensitive input device with the features of claim 14. Advantageous embodiments are set forth in the subclaims.

In the following, the invention will be explained in more detail by means of an example of an embodiment with reference to the drawings in which.

Figure 1:
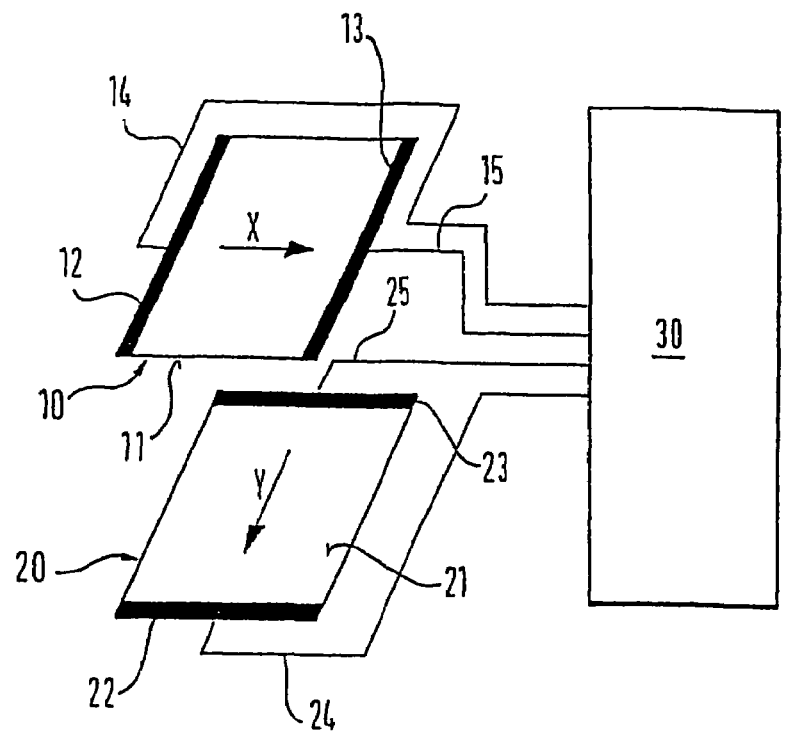
FIG. 1 shows the basic structure of a touch-sensitive input device

To explain the examples of embodiments of a touch-sensitive input device according to the invention, FIG. 1 first shows the basic design of a resistive touch-sensitive input device in 4-wire technology. Two plates 10 and 20 provided with a conductive but resistive coating are arranged one on top of the other at a small distance from each other, whereby the distance is guaranteed by suitable spacing elements on the edge, for example in the form of a frame and over the surface, for example in the form of support points. In the representation shown in FIG. 1, however, the two plates 10, 20 are shown at a clear distance from each other to illustrate the structure. The two conductive coatings 11 and 21 are facing each other. At least one plate is flexible so that the distance between the plates is cancelled on contact so that the plates with their conductive coatings 11 and 21 come into contact with each other in the area of the point of contact. Usually, indium-tin-oxide (ITO) is used as the conductive coating.

Provided on two opposing edges of a conductive coating respectively is a bus connector 12 and 13 or 22 and 23 respectively, generally made of silver which comes into contact with the conductive coating 11 or 21 and to which a connecting lead 14 and 15 or 24 and 25 respectively for connecting an evaluation device 30 is led. The two plates 10 and 20 are arranged in relation to each other so that the two pairs of bus conductors 12 and 13 or 22 and 23 are twisted 90° in relation to each other. This enables the area defined by the conductive coatings to be evaluated in both directions X and Y and a point of contact to be determined in the area.

For the purposes of the description of the invention, bus conductor should be understood to mean any type of electrode arranged on or at a plate and connected to the plate's conductive layer. Bus conductors may be realised in the form of conductors/electrodes which, as shown in the diagrams, extend wholly or to a large extent over the entire length of the side edge of a plate, or also in the form of conductors/electrodes arranged at another point, for example in the corners and/or with another size and/or shape on the conductive layer of a plate in order make contact therewith.

Figure 2:
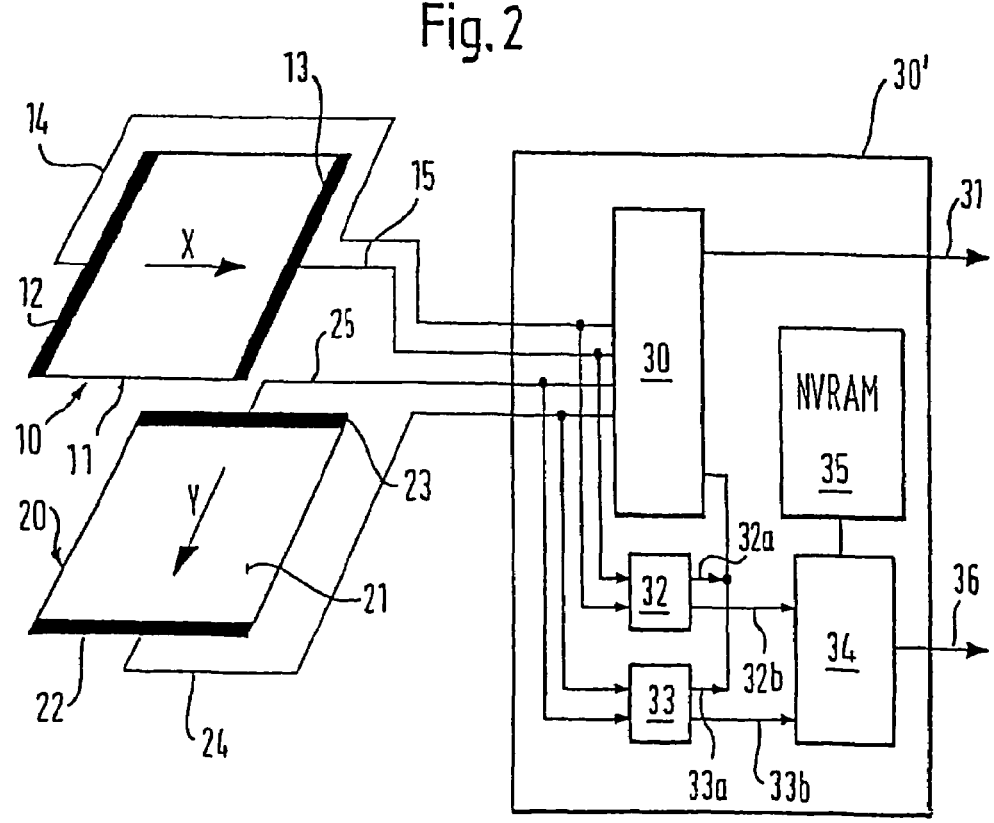
FIG. 2 shows a first example of an embodiment of a touch-sensitive input device according to the invention comprising a fault detection device.

FIG. 2 shows an embodiment according to the invention of the device in FIG. 1 supplemented by a fault detection device. A touch-sensitive input device according to the invention also comprises a conventional evaluation circuit 30 or its functions so that a touch-sensitive input device according to the invention also provides the result of the determination of a point of contact on the active area via an output 31.

In addition, a touch-sensitive input device according to the invention comprises a first and a second measuring device 32 and 33 whose measuring connectors are connected to the connecting leads 14 and 15 or 24 and 25 of the bus conductors 12 and 13 or 22 and 23. In addition, the measuring devices 32 and 33 advantageously also comprise a first output 32a and 33a respectively to which a signal is always output when the two measuring devices 32 and 33 perform a measurement. The signal from the first output of the two measuring devices 32 and 33 is fed to the evaluation circuit 30 which has an input for this purpose and which, when a signal is applied to this input, does not perform an evaluation, but releases the connecting leads 14 and 15 or 24 and 25 of the bus conductors 12 and 13 or 22 and 23 for a measurement by the two measuring devices 32 and 33.

The two measuring devices 32 and 33 perform repeat measurements. To do this, first of all, the first measuring device 32 sends a corresponding signal from the first output 32a to the evaluation device 30. Then, the measuring device 32 applies a reference signal, as a rule a reference voltage or a reference current, to the connecting leads 14 and 15 connected to its measuring connectors and measures the value resulting from the reference signal, that is a measurement current or a measurement voltage. The measured value is determined by the conductive coating 11 on the first plate 10. The first measuring device 32 forwards the measured value via a second output 32b to a monitoring device 34 which first stores the transmitted measuring result in a non-volatile memory 35. The first measuring device 32 then ends its measurement and switches off the signal at the first output 32a. Following this, the second measuring device 33 sends a corresponding signal from the first output 33a to the evaluation device 30 and the second measuring device 33 applies a reference signal to the connecting leads 24 and 25 connected to its measuring connectors, once again as a rule a reference voltage or a reference current and measures the value resulting from the reference signal, that is once again a measurement current or a measurement voltage. The measured value is determined by the conductive coating 21 on the second plate 20. The second measuring device 33 also forwards the measured value via a second output 33b to the monitoring device 34 which once again stores the transmitted measuring result in the non-volatile memory 35. The second measuring device 33 then ends its measurement and switches off the signal at the first output 33a. Following this, the evaluation device 30 starts the evaluation of the touch-sensitive input area again and continues the evaluation until the measuring devices 32 and 33 perform another measurement. The cycle of measurements is hereby based on the application environment and can be freely determined to a large extent as long as the function of the evaluation device and the determination of the point of contact are not impaired.

If already available, after the storage of new result values, the monitoring device reads one or more previously stored result values from the memory 35. The monitoring device 34 compares the result values read out with, for example, the result values most recently transmitted by the first measuring devices and, in prespecified cases, sends a signal indicating a fault via an output 36.

It is possible to store result values in the memory 35 for a lengthy period so that the monitoring device 34 is able both to read out result values that have been recently measured and stored in the memory and also include result values in the monitoring that were measured much longer ago. Advantageously, the time range extends as far back as the commissioning of the touch-sensitive input device whereby advantageously a suitable storage algorithm ensures that result values from further back in the past are stored with a low temporal frequency, so-to-speak thinned out. This means it is possible to ensure that measured values at the start of the lifecycle of the touch-sensitive input device remain stored without it being necessary to provide an overlarge memory. Result values can be suitably deleted or overwritten so that, for example, there is a non-continuous distribution of the measured values over time. In any case, the deletion or overwriting of measured values in the memory 35 enables areas of memory to be used again for current measured values. Alternatively, it is also possible to provide different areas in the memory 35 for long-term and short-term measured values, whereby regularly determined measured values, for example every 1000th result value, are transferred from the short-term area into the long-term area.

The monitoring device uses recently measured result values to determine whether a there is a short-term fault, for example a cable break or a short circuit between the conductive coatings. The long-term result values stored permit the detection of slowly occurring faults, for example, those caused by drift or changes due to continuous loads.

Figure 3:
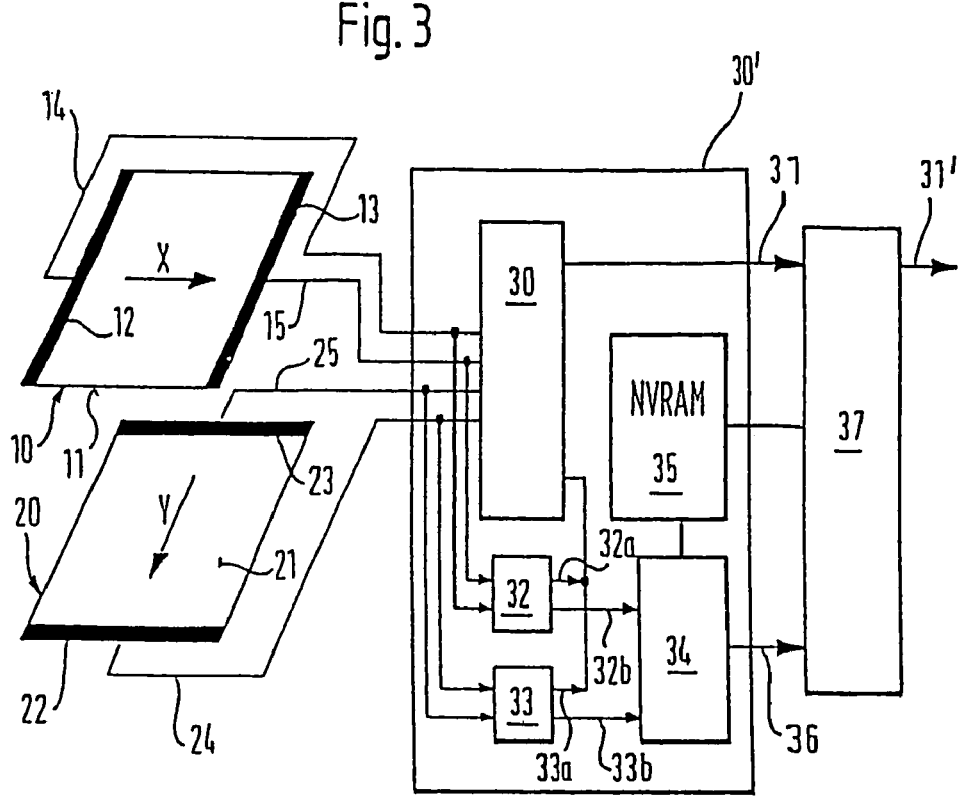
FIG. 3 shows a second example of an embodiment of a touch-sensitive input device according to the invention.

In addition to the detection and signalling of a fault by the monitoring device 34, it is also possible to compensate changes in that the stored result values are used for corrections to the output signal from the evaluation circuit 30. For this, in another example of an embodiment of the invention shown in FIG. 3, a correction device 37 is provided to which is fed the output signal 31 from the evaluation device 30 and the output signal 36 from the monitoring device 34 and which, in the example shown here, is connected to the non-volatile memory 35 at least for direct reading in order to read out result values if a fault signal 36 is present. On the basis of the measured values read out of the memory, the correction device 37 corrects the output signal 31 from the evaluation device 30 and sends a corrected output signal to an output 31'.

The measuring devices 32 and 33 can be combined to form one measuring device which alternatively performs both the measurement at the conductive coating 11 of the first plate 10 and the measurement at the conductive coating 21 of the first plate 20. In addition to this, further integration can be used to integrate the combined measuring device or the individual measuring devices 32, 33 in the monitoring device and the monitoring device 34 in the evaluation device 30'.

The monitoring and signalling functions of the monitoring device 34 can be realised in the form of programs which are filed in a suitable way in the actual monitoring device 34 or in the memory 35 and can be processed by the monitoring device 34.

Figure 4:
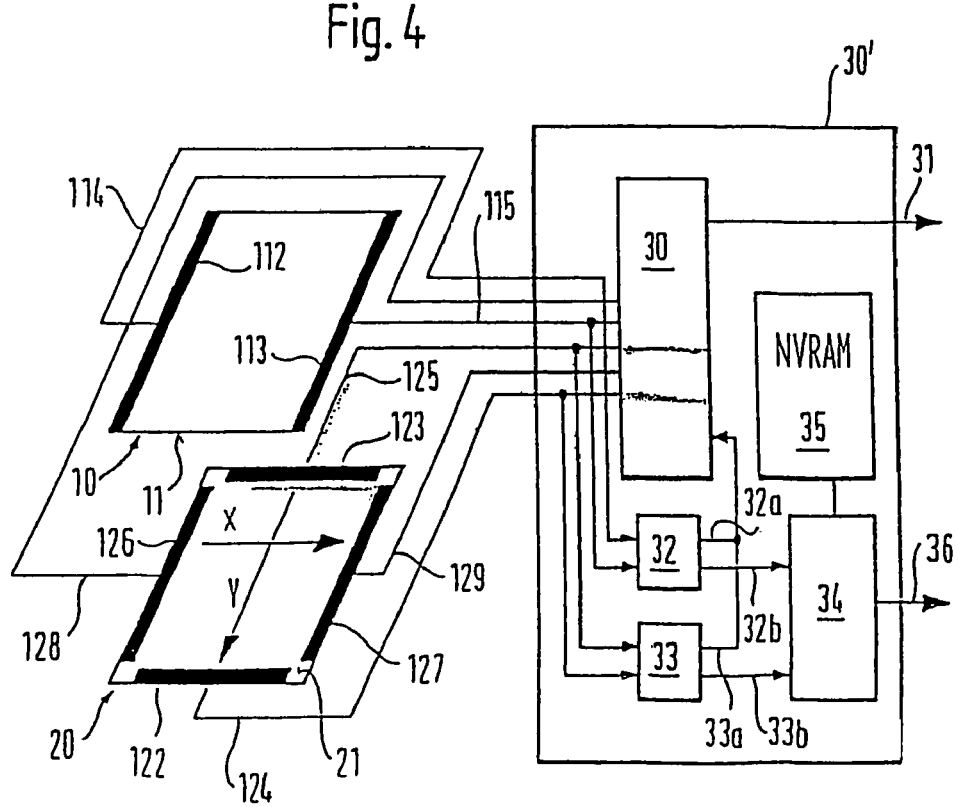
FIG. 4 shows a third example of an embodiment of a touch-sensitive input device according to the invention.

FIG. 4 shows a further example of an embodiment of a touch-sensitive input device according to the invention. This example of an embodiment comprises four bus conductors 122, 123, 126 and 127 on the second plate 20 provided with a conductive layer which are connected to the evaluation circuit 30 via connecting leads 124, 125, 128 and 129. In addition, the evaluation circuit 30 is connected to at least one of the two electrodes of the first plate 10. FIG. 4 shows a connection between the evaluation circuit 30 and the second bus conductor 113 via the connecting lead 115. The connections described so far correspond to the basic structure of a touch-sensitive input device in 5-wire technology. According to the invention, in the example of an embodiment shown in FIG 4, the first measuring device 32 is connected to the first bus conductor 112 and the second bus conductor 113 on the first plate 10. The second measuring device 33 is connected to the third bus conductor 122 and the fourth bus conductor 123 on the second plate 20. Otherwise, in this example of an embodiment, the design corresponds to the previously described examples of embodiments in FIGS. 2 and 3. Reference is made at this point to these diagrams and the associated description.

As with the two first examples of embodiments, the two measuring devices 32 and 33 perform repeat measurements. For this, first a corresponding signal is sent from the first measuring device 32 at the first output 32a to the evaluation device 30. Then, the measuring device 32 applies a reference signal to the connecting leads 114 and 115 connected to its measuring connectors, as a rule a reference voltage or a reference current and measures the value resulting from the reference signal, that is a measurement current or a measurement voltage. The measured value is determined by the conductive coating 11 of the first plate 10. The first measuring device 32 forwards the measured value via a second output 32b to a monitoring device 34, which first files the transmitted measuring result in a non-volatile memory 35. The first measuring device 32 then ends its measurement and switches off the signal at the first output 32a. After this, a corresponding signal is sent from the second measuring device 33 at the first output 33a to the evaluation device 30 and the second measuring device 33 applies a reference signal to the connecting leads 124 and 125 connected to its measuring connectors, once again, as a rule a reference voltage or a reference current and measures the value resulting from the reference signal, that is once again a measurement current or a measurement voltage. The measured value is determined by the conductive coating 21 of the second plate 20. The second measuring device 33 also forwards the measured value via a second output 33b to the monitoring device 34, which once again files the measuring result transmitted in the non-volatile memory 35. The second measuring device 33 then ends its measurement and switches the signal off at the first output 33a. After this, the evaluation device 30 starts again with the evaluation of the touch-sensitive input surface and continues the evaluation until the measuring devices 32 and 33 perform another measurement.

With regard to the evaluation of the measuring results and the configuration of the individual components as integrated parts of other components, reference is made to the description of the two first examples of embodiments, since it is also possible to perform corresponding evaluations and make integrations with the third example of an embodiment.

It is evident that a conventional touch-sensitive input device of the above-described type can be supplemented by a fault detection device according to the invention comprising the measuring devices, the monitoring device and the memory. In this way, the production can be restricted to these components and the retrofitting of existing input devices is possible.

The invention claimed is:

1. Touch-sensitive input device with
   a. a first plate with a first conductive coating on which are provided opposing first and second bus conductors and
   b. a second plate with a second conductive coating on which are provided opposing third and fourth bus conductors,
   c. whereby the plates are arranged on top of each other at a distance from each other in such a way that the conductive coatings are facing each other,
   d. a first measuring device which applies a reference signal to the bus conductors of the first plate and determines a first measured value resulting from the first conductive coating,
   e. a second measuring device, which applies a reference signal to the bus conductors of the second plate and determines a second measured value resulting from the second conductive coating second measured value, and
   f. a monitoring device,
      i. to which the measuring devices transmit the first and the second measured value,
      ii. which stores the transmitted measured values in a memory,
      iii. compares the measured values with each other, and
      iv. which, on the basis of deviations determined from the comparison, determines and signals a malfunction of the input device.

2. Touch-sensitive input device according to claim 1, wherein the plates are arranged in such a way that the first and second bus conductors are arranged in a first coordinate direction (X) and the third and fourth bus conductors are arranged in a second coordinate direction (Y) and that an evaluation device is provided to determine a point of contact in the areas defined by conductive coatings which is connected via connecting leads which is connected to the first to fourth bus conductors respectively in order to determine a point of contact in the area defined by conducting coatings.

3. Touch-sensitive input device according to claim 1, wherein on the second plate, fifth and sixth bus conductors are arranged in a first coordinate direction (X) and the third and fourth bus conductors are arranged in a second coordinate direction (Y) and that an evaluation device is provided for the determination of a point of contact in the area defined by conductive coatings, which is connected via connecting leads to the third to sixth and with the first or second bus conductor respectively.

4. Device according to claim 1, wherein the first and second measuring device are combined to form one measuring device which alternatively performs the measurement at the conductive coating of the first or the second plate.

5. Device according to claim 1, wherein the first or second measuring device are integrated in the monitoring device.

6. Device according to claim 2, wherein the monitoring device is integrated in the evaluation device.

7. Device according to claim 1, wherein the first and/or second measuring device applies as a reference signal a voltage to the first and second or the third and fourth bus conductors and determines the current established as a measured value.

8. Device according to claim 1, wherein the first and/or second measuring device stores as a reference signal a current in the first and second or the third and fourth bus conductors and determines the voltage established as a measured value.

9. Device according to claim 1, wherein the monitoring device accesses measured values stored a short period ago in order to detect short-term malfunctions and/or accesses measured values stored a longer period ago in order to identify long-term malfunctions.

10. Device according to claim 1, wherein monitoring device deletes measured values stored before a predetermined time from the memory in order to release the corresponding memory area for the storage of new measured values and/or overwrites measured values of this type with new measured values.

11. Device according to claim 2, wherein correction device is provided to which are fed an output signal from the evaluation device and an output signal from the monitoring device signaling a malfunction and which, on the basis of measured values stored in the memory, corrects the output signal from the evaluation device and outputs a corrected output signal.

12. Device according to claim 2, wherein the measuring devices emit a signal at an output which is fed to the evaluation device and which causes the evaluation device to interrupt the determination of the point of contact in the area defined by conductive coatings.

13. Device according to claim 1, wherein the memory is a non-volatile memory.

14. Fault detection device for a touch-sensitive input device with a first plate with a first conductive coating on which are provided opposing first and second bus conductors and a second plate with a second conductive coating on which are provided opposing third and fourth bus conductors, whereby the plates are arranged on top of each other at a distance in such a way that the conductive coatings are facing each other, with
   a. a first measuring device which is configured for the application of a reference signal to the bus conductors on the first plate and for the determination of a first measuring value resulting from the first conductive coating,
   b. a second measuring device which is configured for the application of a reference signal to the bus conductors on the second plate and for the determination of a second measuring value resulting from the second conductive coating, and
   c. a monitoring device,
      i. to which the measuring devices transmit the first and the second measured value,
      ii. which stores the transmitted measured values in a memory,
      iii. compares the measured values with each other, and
      iv. which, on the basis of deviations determined from the comparison, determines and signals a malfunction of the input device.

15. Fault detection device according to claim 14, wherein the first and the second measuring device are combined to form one measuring device which alternatively performs the measurement at the conductive coating of the first or the second plate.

16. Fault detection device according to claim 14 wherein the first or second measuring device are integrated in the monitoring device.

17. Fault detection device according to claim 14, wherein the monitoring device is integrated in an evaluation device.

18. Fault detection device according to claim 14, wherein the first and/or second measuring device applies as a reference signal a voltage to the first and second or the third and fourth bus conductors and determines the current established as a measured value.

19. Fault detection device according to claim 14, wherein the first and/or second measuring device stores as a reference signal a current in the first and second or the third and fourth bus conductors and determines the voltage established as a measured value.

20. Fault detection device according to claim 14, wherein the monitoring device accesses measured values stored a short period ago in order to detect short-term malfunctions and/or accesses measured values stored a longer period ago in order to identify long-term malfunctions.

21. Fault detection device according to claim 14, wherein the monitoring device deletes measured values stored before a predetermined time from the memory in order to release the corresponding memory area for the storage of new measured values and/or overwrites measured values of this type with new measured values.

22. Fault detection according to claim 17, wherein a correction device is provided to which are fed an output signal from the evaluation device and an output signal from the monitoring device signaling a malfunction and which, on the basis of measured values stored in the memory, corrects the output signal from the evaluation device and outputs a corrected output signal.

23. Fault detection device according to claim 17, wherein the measuring devices emit a signal at an output which is fed to the evaluation device and which causes the evaluation device to interrupt the determination of the point of contact in the area defined by conductive coatings.

24. Fault detection device according to claim 14, wherein the memory is a non-volatile memory.

* * * * *